US012688637B2

(12) United States Patent
Chae et al.

(10) Patent No.: US 12,688,637 B2
(45) Date of Patent: Jul. 21, 2026

(54) APPARATUS AND METHOD FOR ACQUIRING SUPER-RESOLUTION HOLOTOMOGRAPHIC IMAGES

(71) Applicant: ELECTRONICS AND TELECOMMUNICATIONS RESEARCH INSTITUTE, Daejeon (KR)

(72) Inventors: Byung Gyu Chae, Daejeon (KR); Minsung Yoon, Daejeon (KR); Hyun Eui Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 224 days.

(21) Appl. No.: 18/532,737

(22) Filed: Dec. 7, 2023

(65) Prior Publication Data

US 2024/0378772 A1 Nov. 14, 2024

(30) Foreign Application Priority Data

May 9, 2023 (KR) ......................... 10-2023-0059755

(51) Int. Cl.
*G06T 12/30* (2026.01)
*G06N 3/08* (2023.01)
(Continued)

(52) U.S. Cl.
CPC .............. *G06T 12/30* (2026.01); *G06N 3/08* (2013.01); *G06T 3/4046* (2013.01);
(Continued)

(58) Field of Classification Search
CPC ... G06T 11/008; G06T 3/4046; G06T 3/4053; G06T 2211/464; G06T 2211/441; G06N 3/08; G06N 3/045
See application file for complete search history.

(56) References Cited

U.S. PATENT DOCUMENTS

2011/0137179 A1* 6/2011 Hahn ................. G01N 21/6456
600/476
2015/0268628 A1 9/2015 Sato
(Continued)

FOREIGN PATENT DOCUMENTS

JP 2017-219826 A 12/2017
KR 10-1875515 B1 7/2018
(Continued)

*Primary Examiner* — Syed Haider

(57) ABSTRACT

A method of operating an electronic apparatus configured to generate holotomographic image data according to one embodiment of the present disclosure includes: acquiring fusion data from a fusion imaging apparatus in which a holographic tomography apparatus and a super-resolution fluorescence microscope are combined, in which the fusion data includes input data corresponding to holotomographic image data and output data corresponding to image data of the super-resolution fluorescence microscope; generating a cross-modal inference-based deep learning engine configured to generate a super-resolution tomographic image based on the input data and the output data; and acquiring a molecule-specific tomographic image using the deep learning engine, wherein the molecule-specific tomographic image has nano-resolution.

16 Claims, 7 Drawing Sheets

(51) Int. Cl.
  G06T 3/4046 (2024.01)
  G06T 3/4053 (2024.01)

(52) U.S. Cl.
  CPC ...... G06T 3/4053 (2013.01); *G06T 2211/441*
        (2023.08); *G06T 2211/464* (2023.08)

(56) References Cited

U.S. PATENT DOCUMENTS

| | | | | |
|---|---|---|---|---|
| 2017/0351080 | A1* | 12/2017 | Robert ............... | G02B 21/0072 |
| 2019/0333199 | A1* | 10/2019 | Ozcan .................... | G06N 3/084 |
| 2020/0081236 | A1 | 3/2020 | Park | |
| 2020/0294288 | A1 | 9/2020 | Smith | |
| 2021/0012473 | A1* | 1/2021 | Putman ................ | G06V 20/693 |
| 2021/0134054 | A1 | 5/2021 | Park et al. | |
| 2021/0158525 | A1 | 5/2021 | Iwase et al. | |
| 2021/0174498 | A1 | 6/2021 | Jung et al. | |
| 2021/0244375 | A1 | 8/2021 | Jeong et al. | |
| 2022/0122313 | A1* | 4/2022 | Ozcan .................. | G06N 3/0475 |
| 2022/0383562 | A1 | 12/2022 | Park et al. | |
| 2023/0106383 | A1* | 4/2023 | Yao ........................ | G06T 3/4046 |
| | | | | 382/299 |
| 2024/0005451 | A1* | 1/2024 | Patil ...................... | G06T 3/4046 |

FOREIGN PATENT DOCUMENTS

| | | | |
|---|---|---|---|
| KR | 10-2019-0015546 | A | 2/2019 |
| KR | 10-2021-0041046 | A | 4/2021 |
| KR | 10-2246439 | B1 | 4/2021 |
| KR | 10-2021-0054183 | A | 5/2021 |
| WO | 2014/054776 | A1 | 4/2014 |
| WO | 2017/214421 | A1 | 12/2017 |

\* cited by examiner

Optical illuminating system

Micro electro-mechanical system (MEMS) mirror scan

STED beam

Object beam

M

CL

OL

Holographic tomography (HT) scan

Blood sample

STED scan

Optical imaging system

Charge coupled device (CCD) imaging device

P

Reference beam

BS

TL2

M

Fluorescence image (FL)

Deep learning engine 3D refractive index (RI) image

FIG. 7

Electronic apparatus (700)

Communication unit (710)

Storage unit (720)

Controller (730)

Camera (740)

APPARATUS AND METHOD FOR ACQUIRING SUPER-RESOLUTION HOLOTOMOGRAPHIC IMAGES

CROSS-REFERENCE TO RELATED APPLICATION

This application claims priority to and the benefit of Korean Patent Application No. 10-2023-0059755, filed on May 9, 2023, the disclosure of which is incorporated herein by reference in its entirety.

BACKGROUND

1. Field of the Invention

The present disclosure relates to a technology for acquiring a super-resolution holotomographic image, and more specifically, to an apparatus and method for acquiring a nano-resolution three-dimensional tomographic image based on a low-resolution holotomographic image.

2. Discussion of Related Art

Holotomography (HT) technology is a technology of acquiring a diffraction field scattered from a sample through an interferometer by irradiating a laser beam in a 360 degrees direction in an optical version of an X-ray CT, and restoring a refractive index (RI) distribution image using a Fourier diffraction algorithm. An HT apparatus can measure a three-dimensional refractive index distribution for a living specimen in real time without a preprocessing process such as staining, making it possible to quantify intracellular protein concentration, and cell dry mass and volume in addition to shapes and dynamic behavior of the biological samples. However, currently, resolution for three-dimensional holotomography technology is basically limited to 200 to 400 nm, which is half of the visible light wavelength range, according to the Abbe diffraction limit.

Accordingly, in order to accurately image and analyze nanoscale intracellular organelles and microorganisms such as bacteria and viruses, a high-resolution holographic tomography imaging apparatus that overcomes the Abbe diffraction limit needs to be developed.

SUMMARY OF THE INVENTION

The present disclosure is directed to developing a cross-modal inference-based deep learning engine that secures a deep learning training database (DB) for a nano-resolution image and generates a super-resolution three-dimensional tomographic image to achieve resolution, which overcomes the Abbe light diffraction limit in a holotomographic imaging apparatus, to provide an artificial intelligence-based holotomographic imaging technology capable of acquiring a super-resolution tomographic image through conventional holotomographic imaging.

A method of operating an electronic apparatus configured to generate holotomographic image data according to one embodiment of the present disclosure includes: acquiring fusion data from a fusion imaging apparatus in which a holographic tomography apparatus and a super-resolution fluorescence microscope are combined, in which the fusion data includes input data corresponding to holotomographic image data and output data corresponding to image data of the super-resolution fluorescence microscope; generating a cross-modal inference-based deep learning engine configured to generate a super-resolution tomographic image based on the input data and the output data; and acquiring a molecule-specific tomographic image using the deep learning engine, wherein the molecule-specific tomographic image has nano-resolution.

Further, a holographic tomography imaging apparatus and a stimulated emission depletion (STED) super-resolution fluorescence microscope configured to capture a fluorescence image having nano-resolution may be combined and installed in a method of sharing a scan-based optical illuminating system to construct the fusion imaging apparatus.

In addition, the fusion imaging apparatus may enable acquisition of deep learning training input and output data on a living biological sample in real time.

In addition, the fusion data may include a two-dimensional (2D) digital hologram set captured from various angles using a holotomography apparatus, and a three-dimensional (3D) super-resolution fluorescence microscope image having nano-resolution corresponding to the 2D digital hologram set.

In addition, the fusion data may be imaging data of biological cells and microorganisms such as bacteria and viruses.

In addition, the generating of the cross-modal inference-based deep learning engine may further include restoring a 3D tomographic image from digital hologram imaging data, and modifying and generating various convolution-based deep learning algorithms such as conventional U-Net and the like so that a super-resolution process is integrally performed.

In addition, as a digital hologram including an interference pattern is used as input data, since each voxel of the digital hologram has information about all original image voxels and thus there is no information limitation in principle, generation of a nano-resolution image may be allowed.

In addition, the cross-modal inference-based deep learning engine may allow 3D holographic tomography apparatus resolution to be achieved with a horizontal resolution of tens of nanometers or less.

In addition, the acquiring of the molecule-specific tomographic image may include optimizing an optical system and a system controller of the holotomography apparatus to allow a molecule-specific tomographic image having nano-resolution to be acquired through holographic tomography apparatus imaging.

A method of operating an electronic apparatus configured to generate holotomographic image data according to one embodiment of the present disclosure includes: acquiring deep learning training data from a holographic tomography apparatus and a cryo-electron microscope (Cryo-EM), in which the deep learning training data includes input data corresponding to holotomographic image data and output data corresponding to structural image data from the cryo-electron microscope; generating a cross-modal inference-based deep learning engine configured to generate a super-resolution tomographic image based on the input data and the output data; and acquiring a structural image using the deep learning engine, wherein the structural image has nano-resolution.

Further, the deep learning training data may be composed of a 2D digital hologram set captured from various angles using a holotomography apparatus, and a 3D electron microscope structural image having nano-resolution corresponding to the 2D digital hologram set.

In addition, the fusion data may be imaging data of biological cells and microorganisms such as bacteria and viruses.

In addition, the generating of the cross-modal inference-based deep learning engine may further include restoring a 3D tomographic image from digital hologram imaging data, and modifying and generating various convolution-based deep learning algorithms such as conventional U-Net and the like so that a super-resolution process is integrally performed.

In addition, as a digital hologram including an interference pattern is used as input data, since each voxel of the digital hologram has information about all original image voxels and thus there is no information limitation in principle, generation of a nano-resolution image is allowed.

In addition, the cross-modal inference-based deep learning engine may allow 3D holographic tomography apparatus resolution to be achieved with a horizontal resolution of tens of nanometers or less.

In addition, the acquiring of the molecule-specific tomographic image may include optimizing an optical system and a system controller of the holotomography apparatus to allow a molecule-specific tomographic image having nano-resolution to be acquired through holographic tomography apparatus imaging.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 7 is a block diagram of the electronic apparatus according to one embodiment of the present disclosure.

DETAILED DESCRIPTION OF EXEMPLARY EMBODIMENTS

Figure 1:
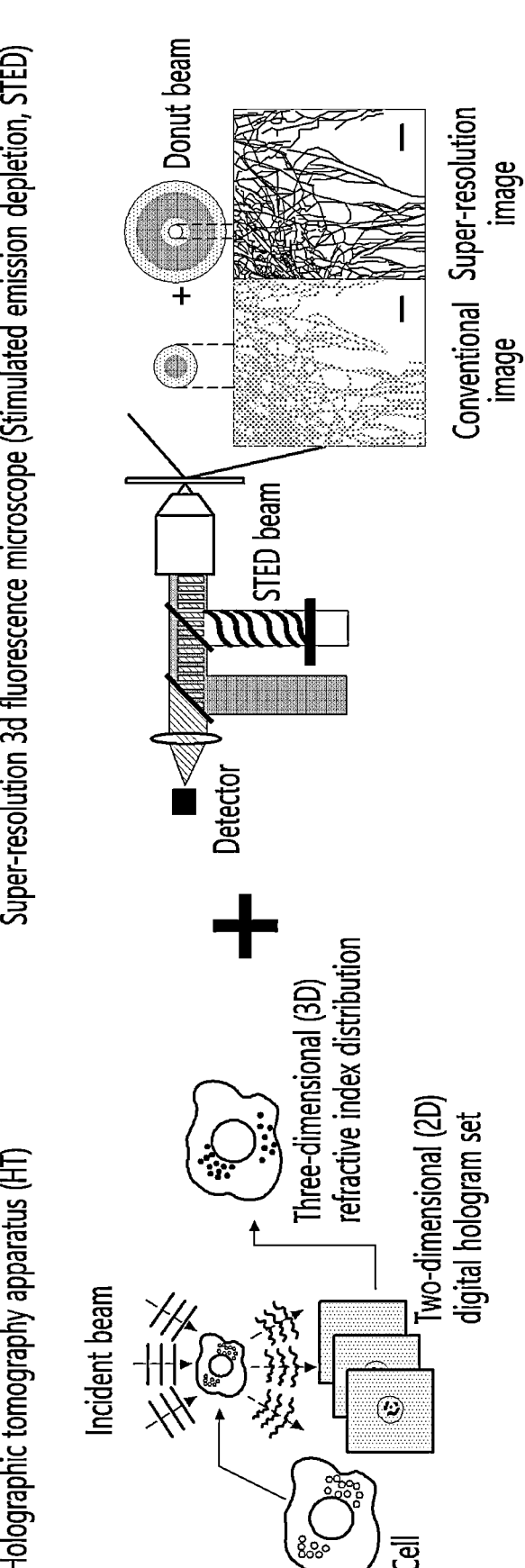
FIG. 1 is a view illustrating the principle of a holographic tomography apparatus and a stimulated emission depletion (STED) super-resolution fluorescence microscope included in an electronic apparatus according to one embodiment of the present disclosure.

A phrase such as "in some embodiments," "in one embodiment," or the like, which appears in various places, in the present specification does not necessarily refer to all of the same embodiment.

Some embodiments of the present disclosure may be represented by functional block configurations and various processing operations. Some or all of these functional blocks may be implemented in various numbers of hardware and/or software configurations that perform specific functions. For example, the functional blocks of the present disclosure may be implemented by one or more microprocessors, or may be implemented by circuit configurations for certain functions. Further, for example, the functional blocks of the present disclosure may be implemented using various programming or scripting languages. The functional blocks may be implemented as an algorithm executed on one or more processors. Further, the present disclosure may employ conventional technologies for electronic environment setting, signal processing, and/or data processing. Terms such as "mechanism," "element," "means," "configuration," and the like may be widely used and are not limited to mechanical and physical components.

Further, connection lines or connection members between the components shown in the drawings only exemplarily represent functional connections and/or physical or circuit connections. In an actual apparatus, connections between the components may be represented by various replaceable or additional functional connections, physical connections, or circuit connections.

Currently, resolution for holotomography (HT) technology is basically calculated to be approximately 200 to 400 nm, which is half of the visible light wavelength range, according to the Abbe diffraction limit, but due to the characteristics of the tomography principle, as there is a synthetic aperture effect, a resolution of up to 110 nm has been reported.

In order to accurately image and analyze nanoscale intracellular organelles and microorganisms such as bacteria and viruses, a super-resolution fluorescence microscope or electron microscope that overcomes the Abbe diffraction limit should be used. Accordingly, a three-dimensional optical microscopy technology capable of observing living biological cells or tissues at the nanoscale in real time by overcoming problems in sample staining or preprocessing is important.

In order to implement super-resolution artificial intelligence (AI) holotomography technology according to an embodiment of the present disclosure, an electronic apparatus may be configured to secure a deep learning training database from a fusion imaging apparatus in which a holographic tomography apparatus and a super-resolution fluorescence microscope are combined, generate a cross-modal inference-based deep learning model using a digital hologram and a super-resolution fluorescence microscope image as input and output data to generate a super-resolution three-dimensional tomographic image, and acquire a molecule-specific tomographic image having nano-resolution using only the holographic tomography apparatus.

FIG. 1 is a view illustrating the principle of a holographic tomography apparatus and a stimulated emission depletion (STED) super-resolution fluorescence microscope included in an electronic apparatus according to one embodiment of the present disclosure.

Referring to FIG. 1, the holographic tomography imaging apparatus implements tomography using a laser, and may irradiate a specimen with laser beams of various incident angles to measure diffracted light in a holographic manner and restore a three-dimensional refractive index (RI) distribution from the measured two-dimensional digital holograms. In this case, restored three-dimensional RI image resolution follows the Abbe diffraction limit.

The stimulated emission depletion (STED) super-resolution optical microscope allows a nano-resolution image to be acquired by shooting a beam that stimulates fluorescence and a beam that suppresses donut-shaped fluorescence, which overlap each other, to a fluorophore to increase spatial resolution in a center region of the donut. Nano-resolution fluorescence images that overcome the Abbe diffraction limit may be captured in real time using a STED beam that suppresses fluorescence.

Figure 2:
FIG. 2 is a view illustrating a fusion imaging apparatus in which the holographic tomography apparatus and the STED super-resolution fluorescence microscope are installed together in the electronic apparatus according to one embodiment of the present disclosure.

FIG. 2 is a view illustrating a fusion imaging apparatus in which the holographic tomography apparatus and the STED super-resolution fluorescence microscope are installed together in the electronic apparatus according to one embodiment of the present disclosure.

Referring to FIG. 2, since the holographic tomography apparatus and an optical illuminating system of the STED super-resolution optical microscope basically use scanning methods, a scanning-type optical illuminating system using a micro electro-mechanical system (MEMS) mirror may be constructed in an integrated manner. Likewise, a STED optical imaging system that acquires an image may also be used in parallel with a holographic tomography interferometric image acquisition system.

In one embodiment, the fusion imaging apparatus may acquire input and output data for deep learning training on a living biological sample in real time.

In one embodiment, input and output data constituting a deep learning training database may be composed of a two-dimensional digital hologram set captured from various angles using a holotomographic apparatus and a three-dimensional super-resolution fluorescence microscope image having nano-resolution corresponding to the two-dimensional digital hologram set.

In one embodiment, the deep learning training database may be constructed by imaging various biological cells and microorganisms such as bacteria and viruses.

Figure 3:
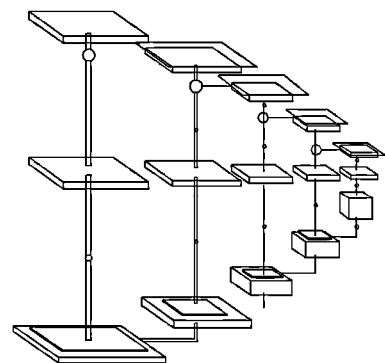
FIG. 3 is a schematic diagram illustrating a deep learning model, which generates a fluorescence image from a conventional three-dimensional refractive index (RI) image, according to one embodiment of the present disclosure.
Figure 3:
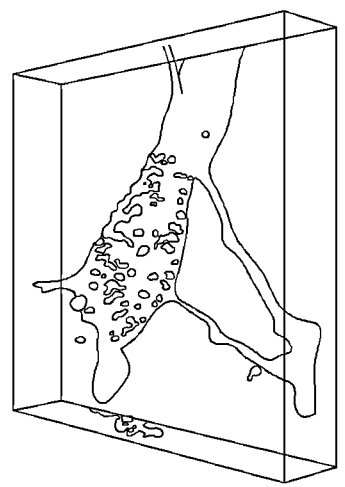

FIG. 3 is a schematic diagram illustrating a deep learning model, which generates a fluorescence image from a conventional three-dimensional RI image, according to one embodiment of the present disclosure;

As shown in FIG. 3, since there is no difficulty in training a fluorescence microscope images and a three-dimensional RI image having the same resolution, it can be seen that a fluorescence image of an intracellular organelle is excellently restored from a three-dimensional RI image of cells.

However, when a super-resolution fluorescence microscope image having a nanoscale resolution that exceeds the resolution of a hologram tomographic image is used as a target image, it may be inappropriate to use a restored tomographic image as input data as in a conventional method.

Figure 4:
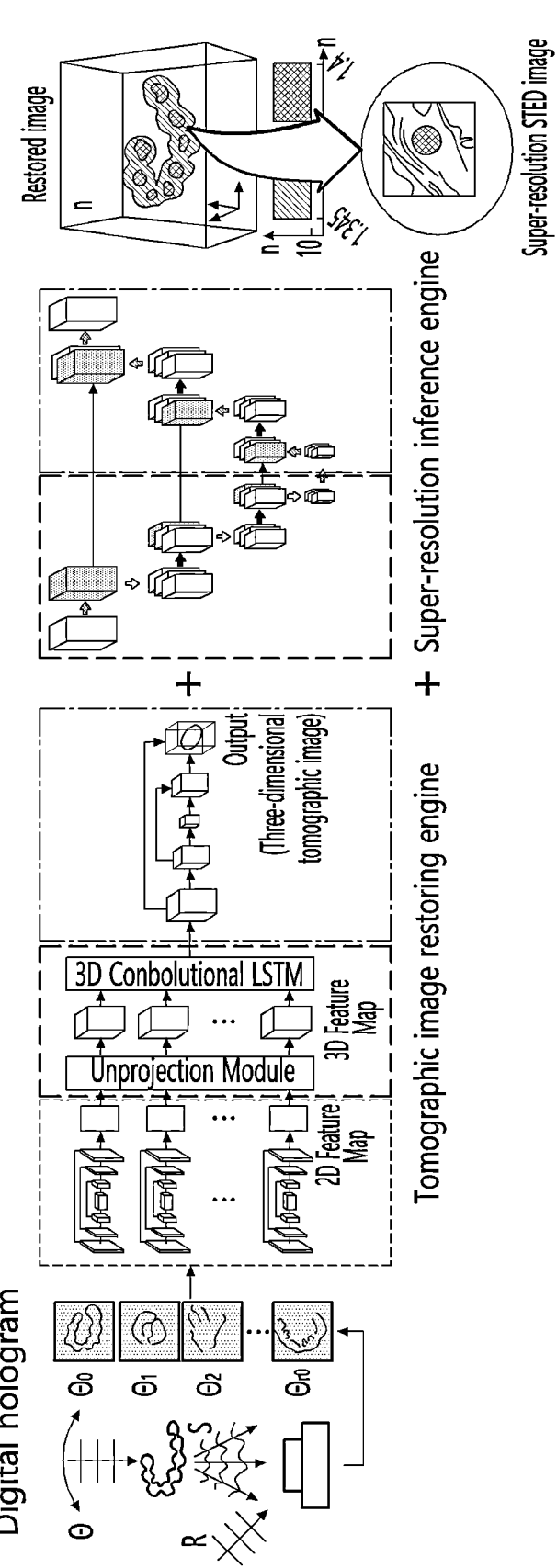
FIG. 4 is a schematic diagram illustrating a deep learning model that generates a structural image having a nanoscale resolution from a holographic image set according to one embodiment of the present disclosure.

FIG. 4 is a schematic diagram illustrating a deep learning model, which generates a structural image having a nanoscale resolution from a holographic image set, according to one embodiment of the present disclosure.

Referring to FIG. 4, the cross-modal inference-based deep learning engine may be configured to integrally perform a process of restoring a three-dimensional tomographic image from digital hologram imaging data and a super-resolution process. A conventional convolution-based super-resolution deep learning engine generates a higher-quality image than a high-order interpolation method, but since a high-resolution image is made through a simple low-resolution image, there is a limitation on information about an input image. However, when a super-resolution algorithm is applied in a process of restoring an image from an interference pattern, that is, a digital hologram, since each voxel of the digital hologram has information about all original image voxels and thus there is no information limitation in principle, it is possible to generate a nano-resolution image.

In one embodiment, the cross-modal inference-based deep learning engine may modify and develop various convolution-based deep learning algorithms such as conventional U-Net and the like.

In one embodiment, the cross-modal inference-based deep learning engine may implement the resolution of a three-dimensional holographic tomography apparatus, which currently remains at a resolution of hundreds of nanometers, with a horizontal resolution of tens of nanometers or less.

In one embodiment, in a software/hardware (SW/HW) system technology developing operation of acquiring a nano-resolution tomographic image, an optical system and a system controller of the holotomography apparatus may be optimized to acquire a molecule-specific tomographic image having nano-resolution only through holographic tomography apparatus imaging.

Figure 5:
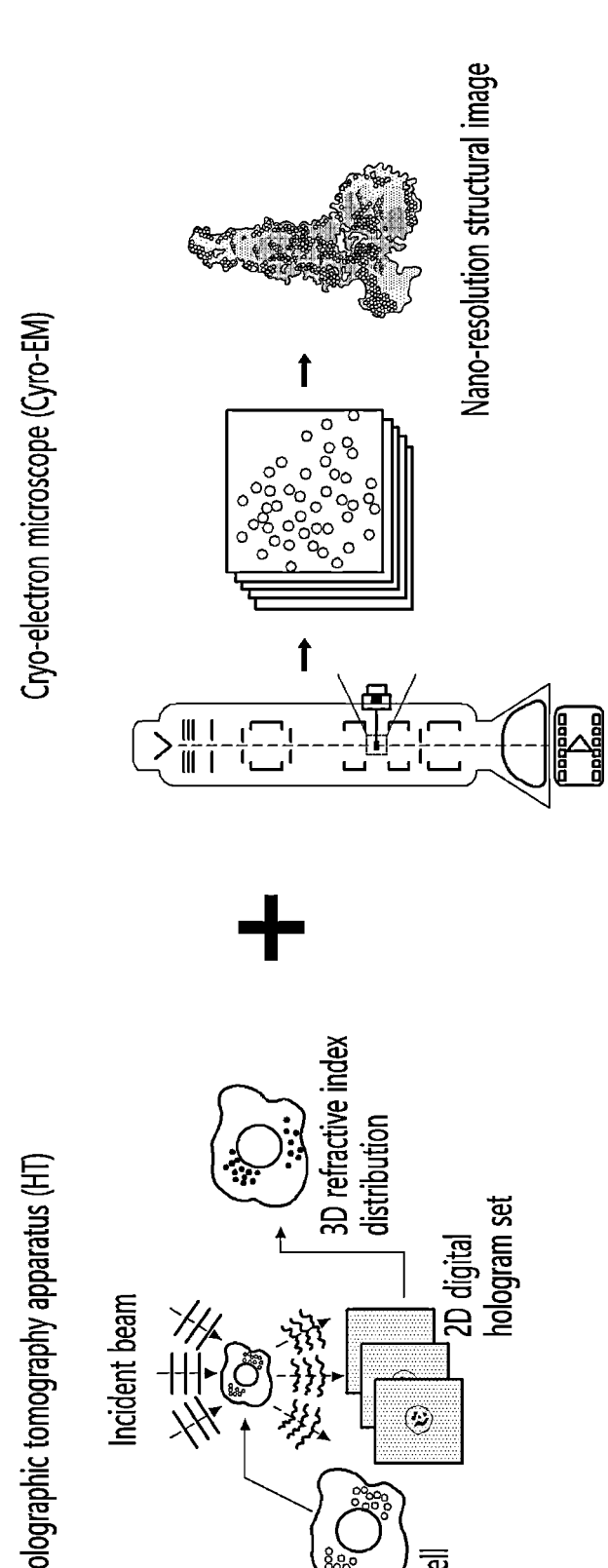
FIG. 5 is a view illustrating the principle of the electronic apparatus according to one embodiment of the present disclosure.

FIG. 5 is a view illustrating the principle of the electronic apparatus according to one embodiment of the present disclosure.

Referring to FIG. 5, the holographic tomography imaging apparatus implements tomography using a laser, and irradiates a specimen with laser beams of various incident angles to measure diffracted light in a holographic manner and restores a three-dimensional refractive index distribution from the measured two-dimensional digital holograms. In this case, the restored three-dimensional RI image resolution follows the Abbe diffraction limit.

Since conventional electron microscopy requires a pre-processing process of slicing and preparing a sample, and measurements should be performed in a vacuum, there is a limitation in observing unique information about a biological sample due to moisture absorption, but cryo-electron microscopy (Cryo-EM) may overcome this disadvantage by observing a biological sample in a natural state while maintaining the biological sample in a cryogenic state. Cryo-electron microscopy (Cryo-EM) allows imaging with sub nano-resolution.

In one embodiment, the input and output data of the deep learning training DB is composed of a two-dimensional digital hologram set captured from various angles using a holotomography apparatus and a three-dimensional electron microscope structural image having nano-resolution corresponding to the two-dimensional digital hologram set.

In one embodiment, the deep learning training DB is constructed by imaging nanostructures of various biological cells and microorganisms such as bacteria and viruses.

In one embodiment, in an operation of developing the cross-modal inference-based deep learning engine, the process of restoring a three-dimensional tomographic image from digital hologram imaging data and the process of modifying and developing various convolution-based deep learning algorithms such as conventional U-Net and the like may be performed so that a super-resolution process is integrally performed.

In one embodiment, as the cross-modal inference-based deep learning engine uses an interference pattern, that is, a digital hologram, as input data, since each voxel of the digital hologram has information about all original image voxels and thus there is no information limitation in principle, it is possible to generate a nano-resolution image.

In one embodiment, the cross-modal inference-based deep learning engine allows three-dimensional holographic tomography apparatus resolution, which currently remains at a resolution of hundreds of nanometers, to be achieved with a horizontal resolution of tens of nanometers or less.

In one embodiment, in an SW/HW system technology developing operation of acquiring a nano-resolution tomographic image, the optical system and the system controller of the holotomography apparatus may be optimized to acquire a nano-resolution three-dimensional structural image only through holographic tomography apparatus imaging.

Figure 6:
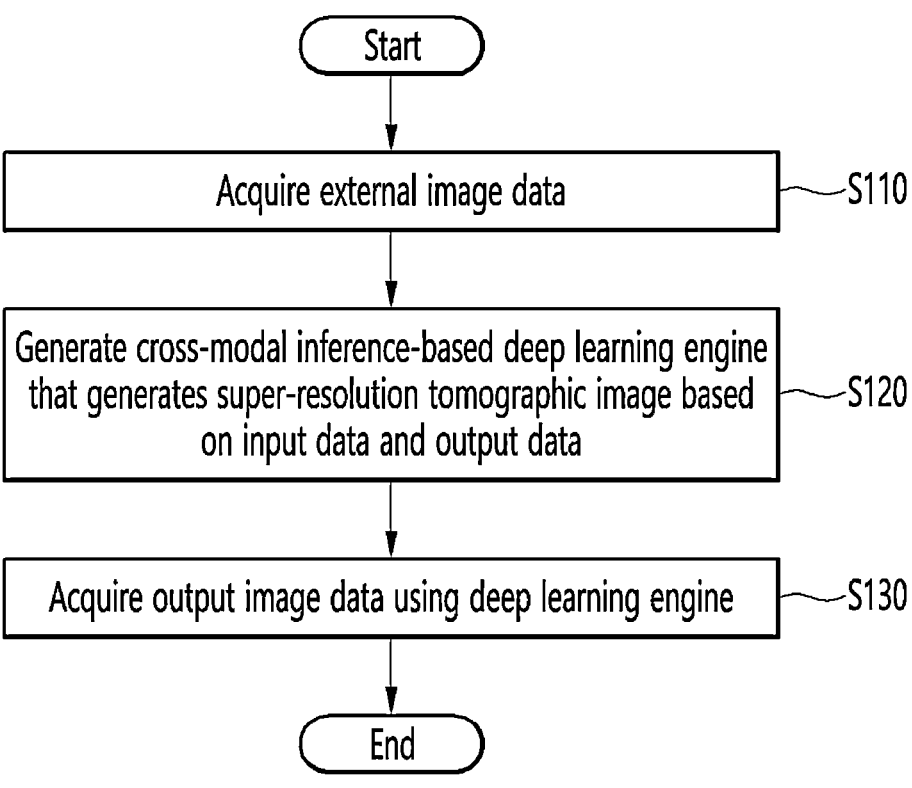
FIG. 6 is a flow chart related to operation of the electronic apparatus according to one embodiment of the present disclosure.

FIG. 6 is a flow chart related to operation of the electronic apparatus according to one embodiment of the present disclosure.

Each operation in FIG. 6 is not limited to the listed order unless there are special circumstances that require it to be performed in the listed order due to a causal relationship.

In operation S110, external image data is acquired.

Here, the image data may be fusion data acquired from a fusion imaging apparatus in which a holographic tomography apparatus and a super-resolution fluorescence microscope are combined.

The fusion data may include input data corresponding to holotomographic image data and output data corresponding to image data of the super-resolution fluorescence microscope.

A holographic tomography imaging apparatus and a STED super-resolution fluorescence microscope, which captures a fluorescence image having nano-resolution, may be combined and installed in a method of sharing a scan-based optical illuminating system to construct the fusion imaging apparatus.

Further, the fusion imaging apparatus enables acquisition of deep learning training input and output data on a living biological sample in real time.

In addition, the fusion data may include a two-dimensional (2D) digital hologram set captured from the various angles using the holotomography apparatus, and a three-dimensional (3D) super-resolution fluorescence microscope image having nano-resolution corresponding to the 2D digital hologram set, and may be imaging data of biological cells and microorganisms such as bacteria and viruses In addition, the image data may be deep learning training data acquired from each of the holographic tomography apparatus and a cryo-electron microscope (Cryo-EM).

The deep learning training data may include input data corresponding to holotomographic image data and output data corresponding to the structural image data from the cryo-electron microscope.

In operation S120, the electronic apparatus generates a cross-modal inference-based deep learning engine that generates a super-resolution tomographic image based on the input data and the output data.

The electronic apparatus may perform a process of restoring a 3D tomographic image from digital hologram imaging data and a process of modifying and generating various convolution-based deep learning algorithms such as conventional U-Net and the like together so that the super-resolution process is integrally performed in a process of generating a cross-modal inference-based deep learning engine.

Further, as the electronic apparatus uses a digital hologram including an interference pattern as input data, since each voxel of the digital hologram has information about all the original image voxels and thus there is no information limitation in principle, a nano-resolution image may be generated.

In addition, the cross-modal inference-based deep learning engine may make it possible to achieve 3D holographic tomography apparatus resolution with a horizontal resolution of tens of nanometers or less.

In operation S130, the electronic apparatus acquires output image data using the deep learning engine.

Here, the output image data may be a molecule-specific tomographic image or structural image. Further, the output image data may have nano-resolution.

More specifically, when the electronic apparatus uses fusion data, the electronic apparatus may acquire a molecule-specific tomographic image using a deep learning engine, and when the electronic apparatus uses deep learning training data, the electronic apparatus may acquire a structural image.

Figure 7:
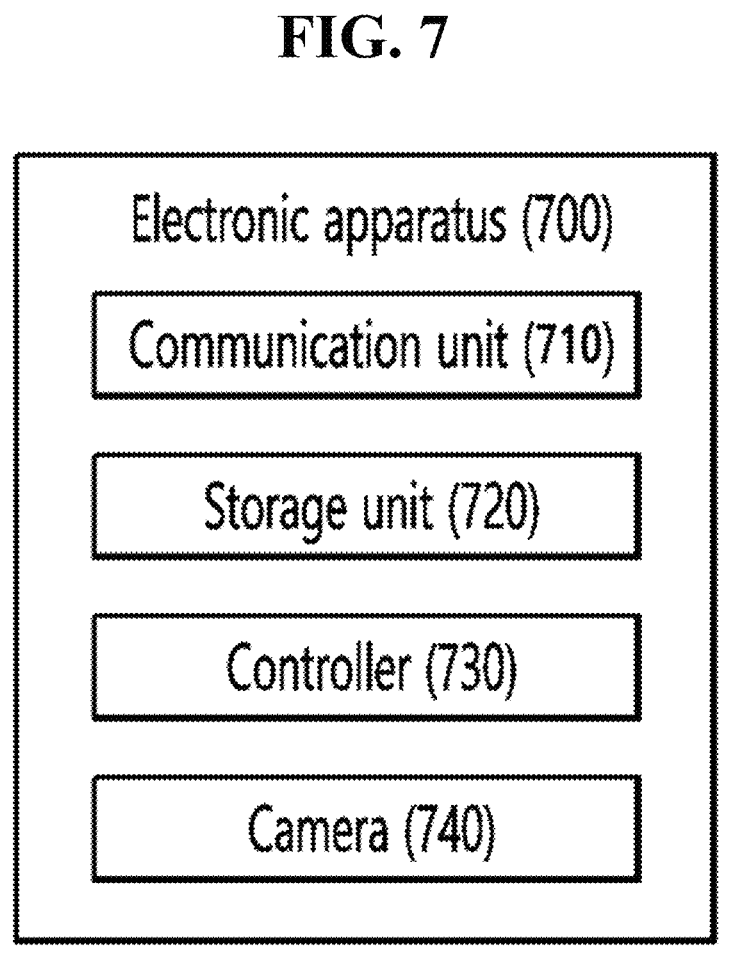

FIG. 7 is a block diagram of the electronic apparatus according to one embodiment of the present disclosure. The configuration exemplified in FIG. 6 may be understood as the configuration of an electronic apparatus 700. A term such as ' . . . unit,' ' . . . device,' or the like used hereinafter refers to a unit, which processes at least one function or operation, and may be implemented as hardware, software, or a combination of hardware and software.

Referring to FIG. 7, the electronic apparatus may include a communication unit 710, a storage unit 720, a controller 730, and a camera 740.

The communication unit 710 may perform functions for transmitting and receiving signals through a wireless channel. For example, the communication unit 710 may include a transmission filter, a reception filter, an amplifier, a mixer, an oscillator, a digital-to-analog converter (DAC), an analog-to-digital converter (ADC), and the like.

Further, the communication unit 710 may include multiple transmission and reception paths. In terms of hardware, the communication unit 710 may be composed of a digital circuit and an analog circuit (for example, a radio frequency integrated circuit (RFIC)). Here, the digital circuit and analog circuit may be implemented as one package.

As described above, the communication unit 710 transmits and receives signals. Accordingly, all or part of the communication unit 710 may be referred to as a 'transmitter,' 'receiver,' or 'transceiver.' Further, in the following description, transmission and reception performed through a wireless channel may be used to mean that the above-described processing is performed by the communication unit 710.

The communication unit 710 may receive a holographic image set and a database related to a three-dimensional structural image from an external server or a computing apparatus, or may transmit a super-resolution holotomographic image corresponding to a target object to the external server or computing apparatus.

The storage unit 720 may store data such as a basic program, an application program, setting information or the like for operating the electronic apparatus. The storage unit 720 may be composed of a volatile memory, a non-volatile memory, or a combination of the volatile memory and the non-volatile memory. Further, the storage unit 720 may provide stored data according to a request from the controller 730.

The controller 730 may control overall operations of the electronic apparatus. For example, the controller 730 may transmit and receive signals through the communication unit 710. Further, the controller 730 may record data in the storage unit 720 and read the data. The controller 730 may perform functions of protocol stacks required by communication standards. To this end, the controller 730 may include at least one processor or microprocessor, or may be part of a processor.

According to various embodiments, the controller 730 may control the operations in FIGS. 1 to 6 to be performed.

The camera 740 may capture a still image and a moving image. According to one embodiment, a camera module 740 may include one or more lenses, image sensors, image signal processors, or flashes.

The camera 740 may be at least one of a holographic tomography imaging apparatus or a STED super-resolution fluorescence microscope included in the electronic apparatus according to one embodiment of the present disclosure. The electronic apparatus may acquire a two-dimensional holographic image set or a three-dimensional structural image of an object through the camera 740.

The present disclosure has an advantage of providing an artificial intelligence-based holotomography imaging technology capable of acquiring a super-resolution tomographic image through conventional holotomographic imaging.

The above-described contents are specific embodiments for implementing the present disclosure. The present disclosure will include embodiments that may be simply changed in design or may be easily changed in addition to the above-described embodiments. Further, the present disclosure will also include technologies that may be easily modified and implemented using the embodiments. Accordingly, the scope of the present disclosure should not be limited to the above-described embodiments and should be defined by the claims to be described below as well as equivalents thereof.

What is claimed is:

1. A method of operating an electronic apparatus for generating holotomographic image data, the method comprising:

acquiring fusion data from a fusion imaging apparatus in which a holographic tomography apparatus and a super-resolution fluorescence microscope are combined, in which the fusion data includes input data corresponding to the holotomographic image data and output data corresponding to image data of the super-resolution fluorescence microscope;

generating a cross-modal inference-based deep learning engine configured to generate a super-resolution tomographic image based on the input data and the output data; and acquiring a molecule-specific tomographic image using the deep learning engine, wherein the molecule-specific tomographic image has nano-resolution.

2. The method of claim 1, wherein a holographic tomography imaging apparatus and a stimulated emission depletion (STED) super-resolution fluorescence microscope configured to capture a fluorescence image having nano-resolution are combined and installed in a method of sharing a scan-based optical illuminating system to construct the fusion imaging apparatus.

3. The method of claim 2, wherein the fusion imaging apparatus enables acquisition of deep learning training input and output data on a living biological sample in real time.

4. The method of claim 1, wherein the fusion data includes a two-dimensional (2D) digital hologram set captured from various angles using a holotomography apparatus, and a three-dimensional (3D) super-resolution fluorescence microscope image having nano-resolution corresponding to the 2D digital hologram set.

5. The method of claim 1, wherein the fusion data is imaging data of biological cells and microorganisms including bacteria and viruses.

6. The method of claim 1, wherein the generating of the cross-modal inference-based deep learning engine further includes restoring a 3D tomographic image from digital hologram imaging data, and modifying and generating various convolution-based deep learning algorithms including U-Net so that a super-resolution process is integrally performed.

7. The method of claim 6, wherein, as a digital hologram including an interference pattern is used as input data, since each voxel of the digital hologram has information about all original image voxels and thus there is no information limitation in principle, generation of a nano-resolution image is allowed.

8. The method of claim 6, wherein the cross-modal inference-based deep learning engine allows 3D holographic tomography apparatus resolution to be achieved with a horizontal resolution of tens of nanometers or less.

9. The method of claim 1, wherein the acquiring of the molecule-specific tomographic image includes optimizing an optical system and a system controller of the holotomography apparatus to allow the molecule-specific tomographic image having nano-resolution to be acquired through holographic tomography apparatus imaging.

10. A method of operating an electronic apparatus for generating holotomographic image data, the method comprising:

acquiring deep learning training data from a holographic tomography apparatus and a cryo-electron microscope (Cryo-EM), in which the deep learning training data includes input data corresponding to the holotomographic image data and output data corresponding to structural image data from the cryo-electron microscope;

generating a cross-modal inference-based deep learning engine configured to generate a super-resolution tomographic image based on the input data and the output data; and acquiring a structural image using the deep learning engine, wherein the structural image has nano-resolution.

11. The method of claim 10, wherein the deep learning training data is composed of a 2D digital hologram set captured from various angles using a holotomography apparatus, and a 3D electron microscope structural image having nano-resolution corresponding to the 2D digital hologram set.

12. The method of claim 10, wherein the deep learning training data is imaging data of biological cells and microorganisms including bacteria and viruses.

13. The method of claim 10, wherein the generating of the cross-modal inference-based deep learning engine further includes restoring a 3D tomographic image from digital hologram imaging data, and modifying and generating various convolution-based deep learning algorithms including U-Net so that a super-resolution process is integrally performed.

14. The method of claim 13, wherein, as a digital hologram including an interference pattern is used as input data, since each voxel of the digital hologram has information about all original image voxels and thus there is no information limitation in principle, generation of a nano-resolution image is allowed.

15. The method of claim 13, wherein the cross-modal inference-based deep learning engine allows 3D holographic tomography apparatus resolution to be achieved with a horizontal resolution of tens of nanometers or less.

16. The method of claim 10, wherein the acquiring of the molecule-specific tomographic image includes optimizing an optical system and a system controller of the holotomography apparatus to allow the molecule-specific tomographic image having nano-resolution to be acquired through holographic tomography apparatus imaging.

\* \* \* \* \*